US012639968B2

(12) United States Patent
Pinho

(10) Patent No.: US 12,639,968 B2
(45) Date of Patent: May 26, 2026

(54) EXTRACTING SLIDE CONTENT FROM VIDEO MEETINGS

(71) Applicant: Dell Products L.P., Round Rock, TX (US)

(72) Inventor: Rômulo Teixeira de Abreu Pinho, Niterói (BR)

(73) Assignee: Dell Products L.P., Round Rock, TX (US)

( * ) Notice: Subject to any disclaimer, the term of this patent is extended or adjusted under 35 U.S.C. 154(b) by 352 days.

(21) Appl. No.: 18/363,064

(22) Filed: Aug. 1, 2023

(65) Prior Publication Data
US 2025/0046106 A1     Feb. 6, 2025

(51) Int. Cl.
*G06V 30/148*          (2022.01)
*G06V 20/40*           (2022.01)

(52) U.S. Cl.
CPC ............ *G06V 30/153* (2022.01); *G06V 20/41* (2022.01)

(58) Field of Classification Search
CPC ...... G06V 30/10; G06V 30/153; G06V 20/41; G06V 20/46; G06V 20/47; G06V 20/49; G06F 16/40
See application file for complete search history.

(56) References Cited

U.S. PATENT DOCUMENTS 9,064,174 B2 *   6/2015   Nister ................. G06V 20/635
11,947,586 B2 *  4/2024   Sun ..................... G06F 16/7834

OTHER PUBLICATIONS

Shun, et al. (Computer English Translation of Japanese Pat. Np. JP 2004 213095 A). (Year: 2004).*
Silva, et al. (Computer English Translation of WO 2022031283 A1). (Year: 2022).*
Girshick, R., "Fast R-CNN", arXiv e-prints, 2015. doi: 10.48550/arXiv.1504.08083.
Redmon, J., Divvala, S., Girshick, R., and Farhadi, A., "You Only Look Once: Unified, Real-Time Object Detection", arXiv e-prints, 2015. doi: 10.48550/arXiv.1506.02640.

* cited by examiner

*Primary Examiner* — Daniel G Mariam
(74) *Attorney, Agent, or Firm* — Workman Nydegger

(57)          ABSTRACT
Detecting and extracting contents from video data in text form is disclosed. Frames of the video data are analyzed to identify a scene, which includes a sequence of frames, that may include slide content. When the sequence of frames is determined to be slide content, optical character recognition is performed on one of the frames in the sequence to identify words and word coordinates. Post processing is then performed on the output of the optical character recognition to identify words, lines, objects, coordinates, and time codes. The output is stored as searchable text in a database. Video data can be searched based on text extracted from speech and/or text extracted from images.

20 Claims, 6 Drawing Sheets

| Timecode | Content | Content Type | Metadata |
|---|---|---|---|
| 00:33:27 | "Good Morning. Today I will present to you sojme aspects of automatic slide content transcription in online video meetings." | Speech | {Speaker: "john doe"} |
| 00:33:35 | "Slide Sharing" | Slide Text | {speaker: "john doe", bbox: {40,40,100,50}} |
| 00:33:35 | "This is an example slide" | Slide Text | {speaker: "john doe", bbox: {45,60,120,70}} |
| ... | \<blob\> | Slide Image | ... |
| 00:33:35 | ... | ... | {speaker: "john doe", bbox: {160,200,55,85}} |

EXTRACTING SLIDE CONTENT FROM VIDEO MEETINGS

FIELD OF THE INVENTION

Embodiments of the present invention generally relate to data management including extracting textual content from video data. More particularly, at least some embodiments of the invention relate to systems, hardware, software, computer-readable media, and methods for searching for or extracting data or text from video streams, video recordings and other video data.

BACKGROUND

The manner in which people interact and collaborate in multiple settings, including employment settings, has changed. Many employers have transitioned at least some of their employees to a hybrid arrangement or a fully remote arrangement. To support this transition, various tools have been developed that are geared toward helping people work together and collaborate.

One of these tools is software that allows users to have online meetings. Usually, these meetings include both video and audio and are often referred to as video meetings. Video meetings allow people to meet and collaborate without having to be present in the same physical location. In addition, video meetings typically involve video data that is streamed. The video data can also be saved. Saving the video data allows the video data to be accessed and shared as desired. In fact, video data corresponding to virtual meetings has become a valuable resource. The difficulty is finding a specific location in the video data of interest to a user without having to watch the entire video.

In many examples, there are services that can generated time-coded text of the audio portion of video data using speech-to-text tools. However, there is much room for improvement. Many users may want to review a concept or detail that was discussed during a video meeting that was presented in a non-verbal form, such as an image. For example, a user may present a slide deck using the video meeting software. The slide deck (or its slides), however, is simply an image in the video data.

Many users may not be able to remember the specific meeting or point in time in the meeting when a particular slide or image based content was presented. Thus, even though the data desired by a user exists, accessing or searching for that data is much more difficult and may be time-consuming. Even assuming that snapshots of a video meeting can be performed at various times, this does not allow the snapshots themselves to be searchable or easily found.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 4 discloses aspects of storing searchable text generated from video data.

DETAILED DESCRIPTION OF SOME EXAMPLE EMBODIMENTS

Figure 1A:
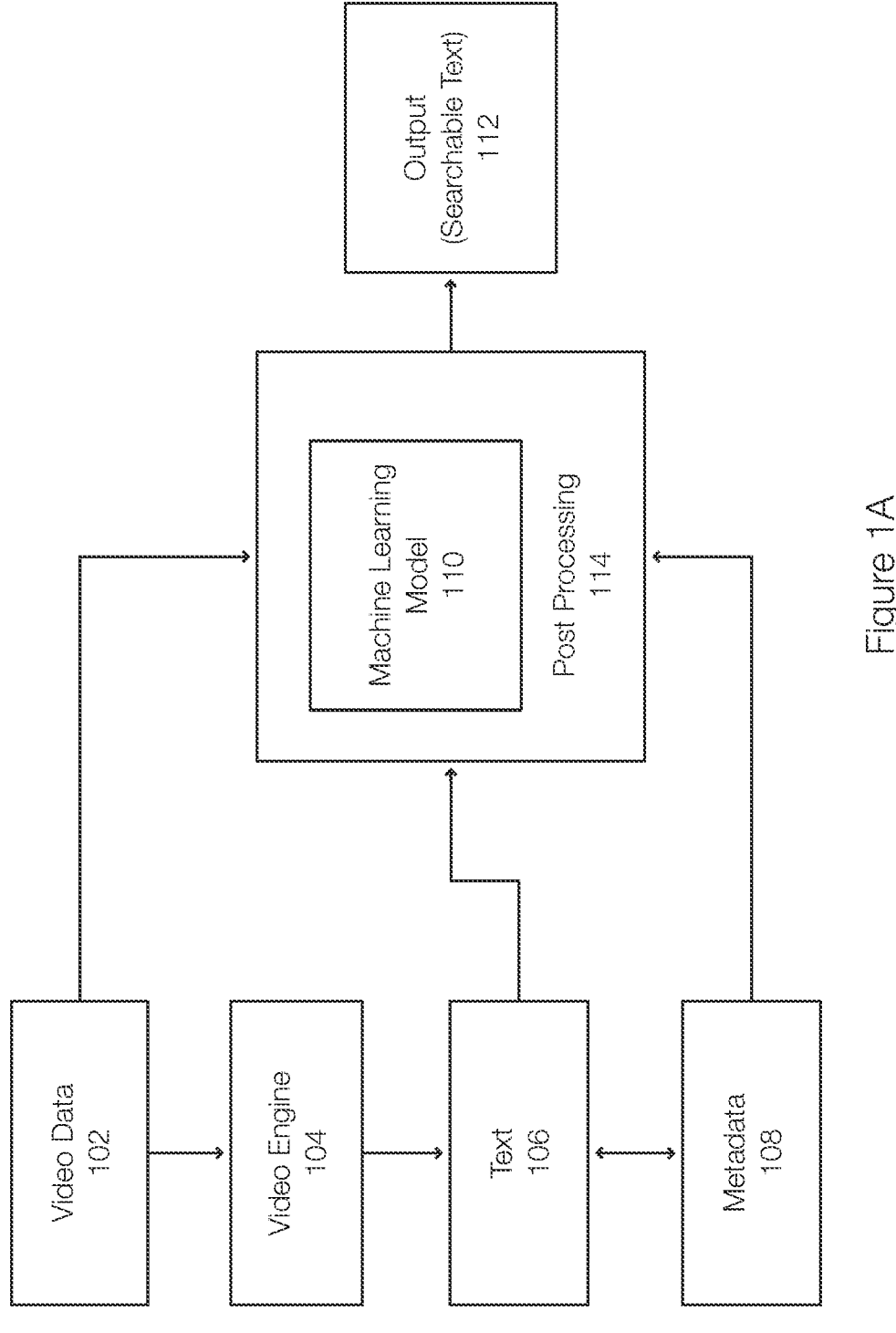
FIG. 1A discloses aspects of a video engine configured to generate searchable text from video data.

Embodiments of the present invention generally relate to data management and to searching video data. More particularly, at least some embodiments of the invention relate to systems, hardware, software, computer-readable media, and methods for extracting and storing text from video data and to searching the video data based on the extracted text and associated metadata.

Embodiments of the invention relate to video data of various forms. Video data may include stored video data, streaming video data, or the like. Video meetings are an example of video data and embodiments of the invention may operate with respect to real-time video meetings (e.g., the streamed video data), stored video meetings, or the like. Generally, a video meeting includes a visual component (e.g., images or frames) and an aural component (the audio or speech). Embodiments of the invention further relate to extracting text from the images or frames of video data such as a video meeting.

In many video meetings, various types of content may be shared by a user. The content being shared is processed and converted to video data. In one example, a user may share slides (or a slide deck). If a user is sharing their screen, the content on the screen, which may include slide content, is converted to video data such as images or frames. Thus, any text present in the slides is represented in the video data as an image and embodiments of the invention relate to extracting the text that may be present in the images or frames of video data.

Data in these slides may be presented visually and may not be verbalized. As a result, conventional speech-to-text engines are unable to capture the data or text that is only presented visually as an image. This may hamper attempts to search the video data for certain content. A user may desire to search video data for the content of a specific slide, but the text in that slide is not conventionally searchable.

Embodiments of the invention relate to detecting visual content, such as slides, and extracting the image-based text in the visual content of the video data. For example, the image-based text of a slide may be subjected to optical character recognition operations. This allows information that is presented visually to be converted to text and stored alongside speech transcriptions. This facilitates searches of video data and allows users to find specific locations in video data in which a slide may be presented.

Embodiments of the invention may be applied to real time video and offered as a tool for live transcriptions. Thus, the transcription may include information that is presented aurally and visually. Further, embodiments of the invention can be used to process previously recorded video data to generate transcriptions that include aural information that has been converted to text and image-based textual information that has been converted to text or other format.

Embodiments of the invention are discussed in the context of slides in part because slides often include text that is only presented visually as images in video data. However, embodiments of the invention relate to any visually presented text (e.g., image-based text) in video data. Image based text can be present in slides that are converted to images and in other content that is converted to images or frames in the video data.

In one example, video data is analyzed frame by frame to detect a scene transition. In the context of certain video data, such as video meetings, the video data is often static and unchanging. For example, a slide may be presented in the video as an image. Even if the slide is accompanied by speech, the visual portion of the video data does not change and may be static for some period of time. If a new slide is presented (and thus a new image or an updated frame), a scene transition may be detected due to the frame difference or delta-frame. More specifically, adjacent frames can be compared in embodiments of the invention. When a difference between frames is greater than a threshold difference, a scene transition may be detected. Thus, the difference between a frame having an image of a first slide and a second frame having an image of a second image may have a delta-frame that is larger than the threshold.

In some examples, because the format of a video meeting may be known, embodiments of the invention may be applied to partial frames. For example, a slide may be presented in the video data while images of the users may be presented below the slide content. This may be used such that the delta-frame is based on the area of the frame corresponding to the image of the slide content.

When slides are being shared in a video meeting, multiple frames are presented. From a user's perspective, a static image is presented on the screen. While a particular slide is being presented, the delta-frame is usually small. When a delta-frame or scene change is detected, the portion or interval of the video data corresponding to the time during which a delta-frame was not detected may be flagged and processed for text. In other words, embodiments of the invention may flag a scene, which may correspond to multiple frames and/or a period of time that can be identified using time codes or time stamps. Thus, a scene may be present or detected between two consecutive scene changes.

More specifically, slide content is often text-based. When slide content (or a scene) is flagged, a snapshot may be taken (e.g., by selecting one of the frames) and the snapshot or selected frame may be processed using optical character recognition. This allows the text in a scene to be identified and converted to actual text.

The frame may be further processed to provide textual content. For example, the text may be processed to identify lines of text, groups of lines of text, coordinates of the text, lines of text, words, or the like that are related and structured. In one example, the optical character recognition operation may, in addition to generating text (words), generate the positions or coordinates of the words and characters in the scene (e.g., the frame or image). Further, post-processing may also detect the presence of non-textual content and save this as searchable metadata. The snapshot and the information extracted from the snapshot can be associated with video time codes and stored in a database. This allows searches to be more efficiently performed on video data.

FIG. 1A discloses aspects of generating searchable text from video data. FIG. 1A illustrates a video engine 104 that receives video data 102 as input. The video data 102 may include live video streams, saved video streams/files, or the like. The video data 102 typically includes a visual component and an audio component. The video engine 104 may be configured to convert image based text in the image (e.g., text on slides) to text 106. The video engine 104 may also convert the audio portion of the video data 102 to text (speech to text).

The text 106 includes or is associated with metadata 108. For example, the text 106 (e.g., words found in the frame or image) may be associated with time codes, frame or image coordinates, or the like. Next, the video data 102, the text 106, and/or the metadata 108 may be input into a machine learning model 110. The model 110 is trained, in one example, with slide content converted to images where text sentences and non-textual information are segmented into bounding boxes containing the text sentences and not-textual information. The model 110 is trained such that, when presented with slide input, the model 110 can identify bounding boxes for the textual content and/or the non-textual content in the slide or image. The training procedure may optimize a loss function that indicates whether a rectangular region of the image space corresponds to a segmented region and to which class it belongs. The bounding boxes allow the words identified during optical character recognition to be associated as sentences. This may enhance the manner in which the searchable text is searched. Each bounding box identified at inference by the trained model 110 may constitute a segment or portion of the frame and each of these segments may be assigned a class label.

More specifically, during post processing 114, machine learning may be used to generate inferences about the textual data and the non-textual data. At inference time, the model 110 may receive an image (e.g., a video frame from the video data 102), the metadata 108, and/or the text 106. The model 110 may identify all bounding boxes (e.g., segments or all textual and non-textual bounding boxes) of the image that the model 110 can detect.

Post processing 114 then uses the word coordinates previously determined and included in the metadata 108 and the words from the searchable text 106 to determine which sets of words fall into the same textual bounding boxes. A set of words within the same bounding box may form a sentence that may be further processed, along with individual words and other non-textual elements. The post processing 114 thus outputs an output 112 or searchable text.

Figure 1B:
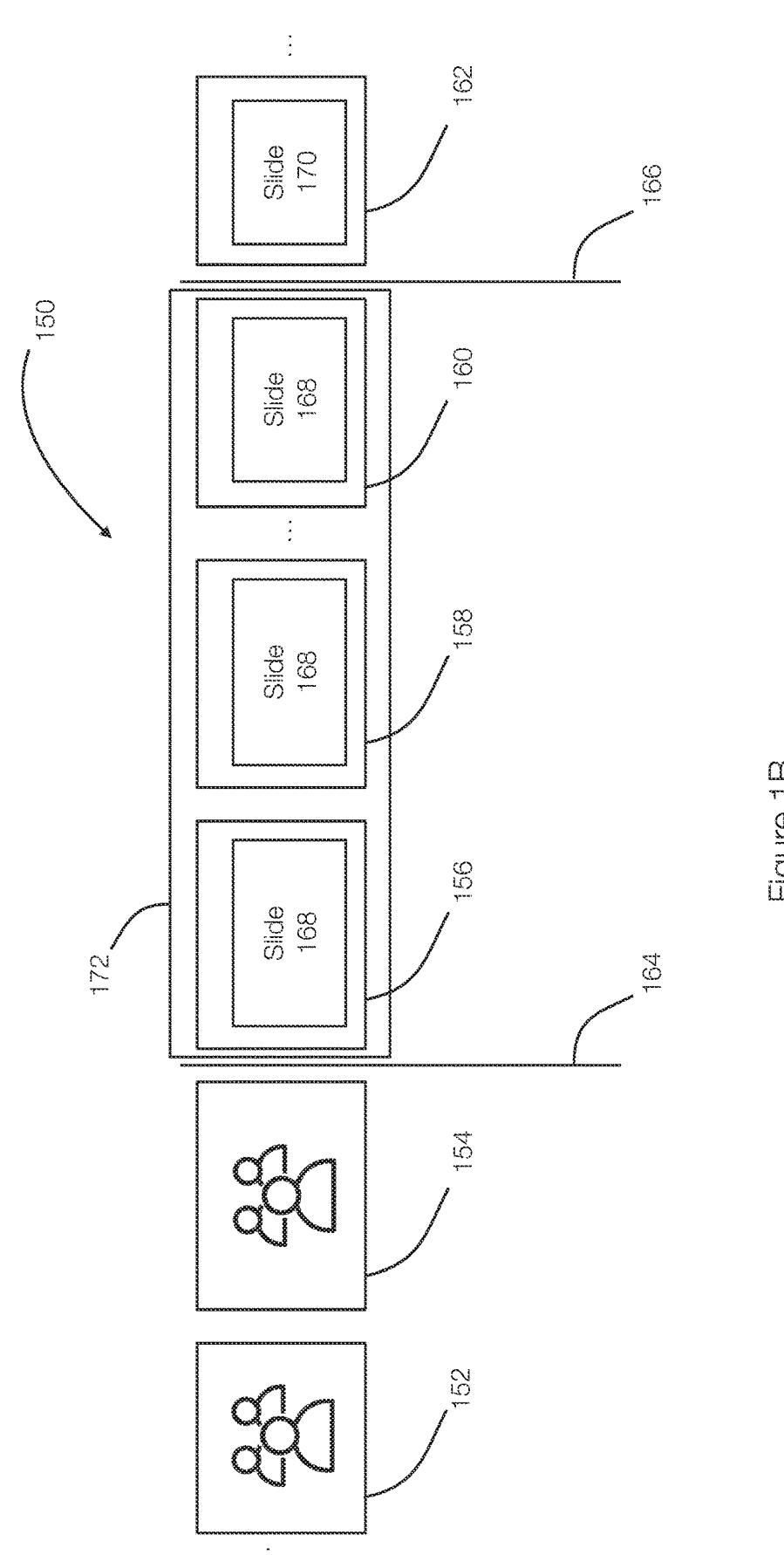
FIG. 1B discloses aspects of processing the video data to identify scenes and delta frames.

FIG. 1B discloses aspects of processing video data to identify scenes (e.g., a sequence of frames that may include image based textual content) and delta frames. FIG. 1B illustrates video data that include frames 150. In one example, the frames 150 may correspond to a video meeting. In the frames 152, 154 and 162, the participants of the video meeting May be visible. In the frames 156, 158, and 160, a first slide 168 may be presented. In the frame 162, a second slide 170 may be presented.

In this example, a difference between the frames 154 and 156 is large as the entire frame changes. This suggests that there is a scene change 164 occurring. The difference between the frames 156 and 158 and the difference between the frames 158 and 160 is comparatively small if not zero because no change is occurring in the video frames. However, another scene change 166 is detected between the frame 160 and the frame 162 as the display or video changes from the first slide 168 to the second slide 162, which is illustrated in the delta-frame between the frames 168 and 170.

These frame differences allow scenes to be identified. In this example, all frames between the scene change 164 and the scene change 166 may be viewed as a scene where each frame includes substantially the same content. A scene may also be determined for all frames that include the slide 170. When the display or video changes to include a third slide, the scene associated with the second slide 170 can be identified.

With regard to the frames 152 and 154, the delta frame or changes from one frame to the next may be larger as the individuals in the frame may move or change positions. Further, embodiments of the invention may not consider a short number of frames to constitute a scene as it is unlikely that a slide is displayed for a relatively few number of frames. For example, a scene may constitute a series of frames that do not experience a delta frame above a threshold for a period of time (e.g., 2 seconds, 5 seconds or any other threshold.

When a scene, such as the scene 172, is identified, a particular frame may be selected for processing (e.g., text extraction). In one example, the frame in the scene 172 that has the highest signal to noise ratio may be selected for processing. If the frame 158 has the highest signal to noise ratio, then the frame 158 is used for optical character recognition and segment identification purposes for the scene 172.

In one example, the video engine, which may be configured to detect or identify scenes and scene changes, receives a video stream that includes video frames and associated timecodes. Scene changes are detected, by way of example, by determining a pixel-wise difference $\delta_i$ between two subsequent frames ($\{f_i, f_{i-1}\}$). The video engine may check to determine whether $\delta_i > t_1$, where $t_1$ is a threshold. If the test passes, the slide content detection state is entered.

In the slide content detection state, a sequence of video frames is obtained directly from the video stream until the next scene change is detected at frame $f_{j+1}$. The video engine then analyzes the sequence of frames $f_i, \ldots, f_j$ and checks whether $(j-i) > t_2$, where $t_2$ is another threshold. This test checks whether the sequence of video frames is long enough to contain relevant slide content. If the test passes, a second procedure computes the average pairwise distance between all subsequent frames of the sequence ($\delta_j$) and checks whether $\delta_j < t_3$. If this test passes, the sequence $f_i, \ldots, f_j$ is classified as slide content.

In one example, the threshold $t_3$ is small based on the assumption that slide content typically corresponds to a still image over relatively long time intervals. As a result, the average pixel-wise difference between subsequent video frames is likely to be close to zero, as is the average pairwise difference across the entire sequence. In one example, $t_3$ cannot be set to 0 because video streaming is subject to many image artifacts resulting from image compression, network issues, and the like that may impact video quality. In one example, the video engine also considers the network status such that the video engine is not fooled by a network issue that causes the video to stop a certain frame.

Figure 2:
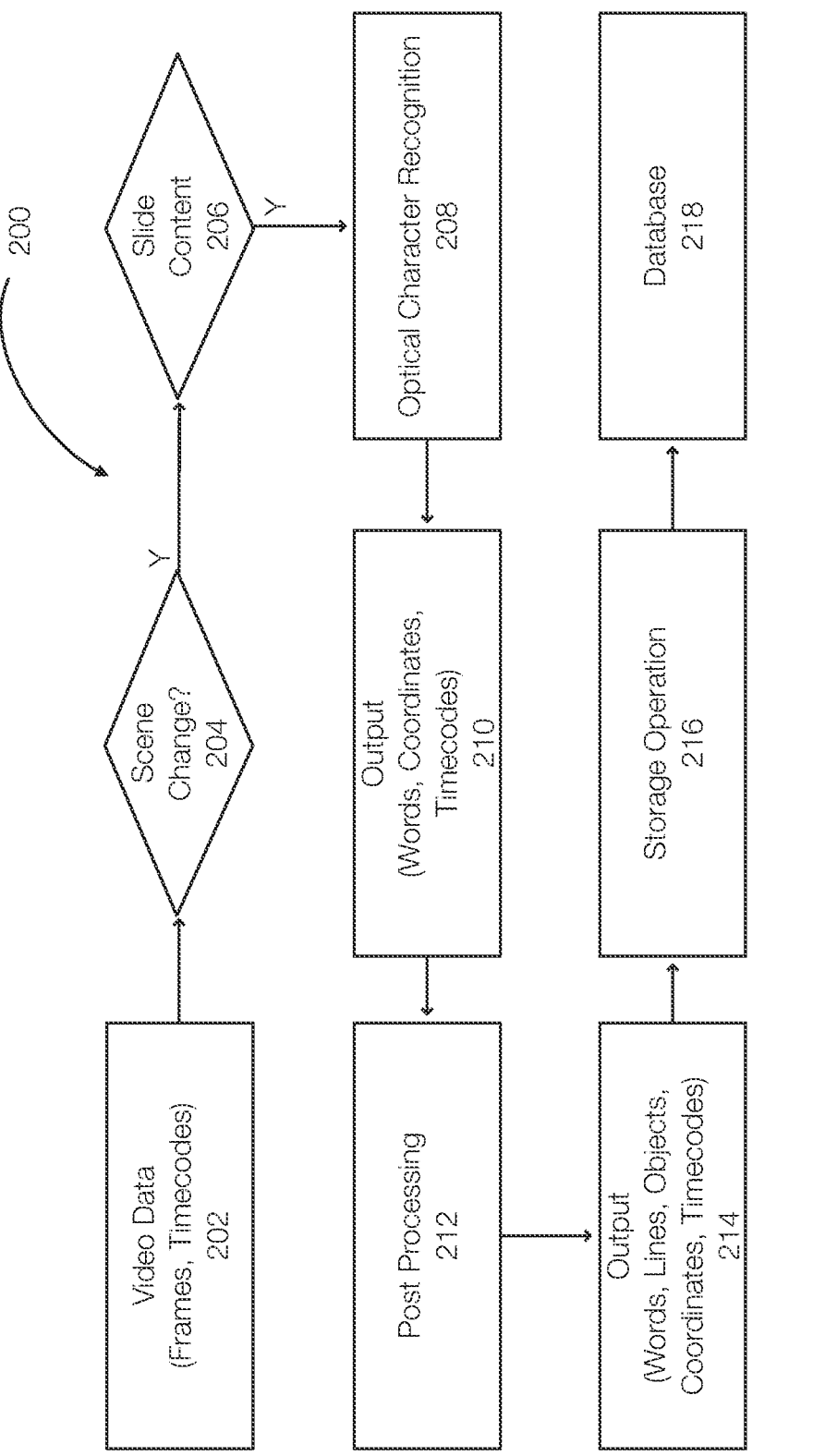
FIG. 2 discloses aspects of generating searchable text from images included in video data.

FIG. 2 discloses aspects of a method for generating searchable text. The method 200 may begin by acquiring 202 video data. In this example, the video data includes, in addition to audio, frames and timecodes. For example, each frame may be associated with a timecode. Next, the frames are processed to identify a scene change 204. When a scene change is identified (Y at 204), the method 200 determine that slide content 206 is present in the frames preceding the scene change 204. In one example, all frames since the last scene change may be considered to be a scene that includes slide content 206. Determining whether the sequence of frames is slide content may include determining whether the sequence includes a sufficient number of frames (the $t_2$ threshold) and determining that the average pairwise difference across this sequence of frames satisfies a threshold ($\delta_j < t_3$).

When it is determined that the scene or sequence of frames is slide content (Y at 206), a particular frame from the scene is selected and optical character recognition 208 is performed. The optical character recognition operation allows words and characters in the selected frame to be recognized and noted. Thus, the selected frame is associated at least with words and characters. Metadata that identifies the coordinates of the words in the frame may also be generated. The video engine thus generates an initial output 210 that includes words, coordinates, and timecodes. The timecodes may correspond to a particular frame and/or for the duration of the scene.

Figure 3:
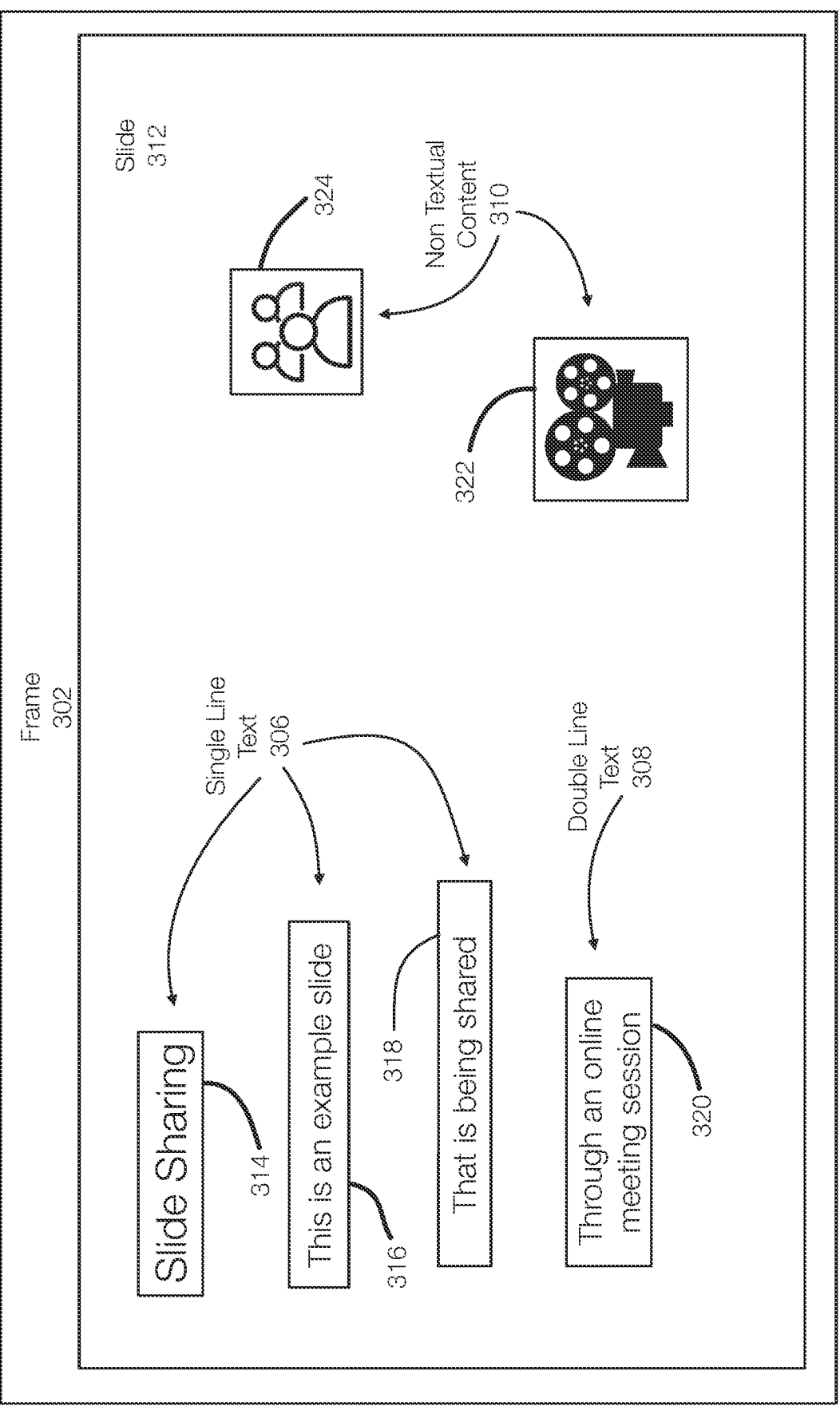
FIG. 3 discloses aspects of performing post processing.

After the words, coordinates, and timecodes are identified, post processing 212 is performed. FIG. 3 discloses aspects of performing post-processing. FIG. 3 illustrates a frame 302 that includes an image, which is the slide 312 in this example. The slide 312 (or the frame 302) is processed by a model (e.g., the model 110) that is configured to identify individual words or groups of words. More specifically, the model 110 is trained using slide content that has been converted to images in which text sentences and non-textual information are segmented into the bounding boxes. The model 110 may identify bounding boxes in the current frame 302.

Thus, the model 110 may generate an output that identifies the bounding boxes 314, 316, 318, 320, 322, and 324. These may be identified using coordinates. The bounding boxes 314, 316, and 318 may be labeled as single line text 306, the bounding box 320 may be labeled as a double line text 308, and the bounding boxes 322 and 324 may be labeled as non-textual content 310. Thus, the model can receive the frame 302 as input and return all the textual and non-textual bounding boxes the model 110 can detect.

Returning to FIG. 2, the post processing 212 may use the word coordinates from the optical character recognition 208 operation and determine which words fall into the textual bounding boxes detected by the post processing 212 (or by the video engine or the model 110). A set of words in the same bounding box may be deemed to be a sentence and can be arranged as a sentence based on the word coordinates. The non-textual content can also be processed and may be related to specific sentences. When searching for specific words, this allows associated non-textual content to be returned as well in the results of the search.

The post processing 212 may generate an output 214 that includes words, lines, objects, coordinates (e.g., of words, of bounding boxes, of sentences), and/or timecodes. A storage operation 216 may be performed to store the output 214 in a database 218, which can be searched.

FIG. 4 illustrates an example of searchable text that is stored in a database. The table 400 represents the searchable text and include, by way of example, a timecode, content (the extracted text from the frame or image), content type, and metadata. This allows a user to search for keywords, type of content, speaker, location in frame, time, or the like or combination thereof. A user may search, for example, for text associated with a specific speaker.

The entry 402 in the table 400 is speech (audio) that was converted to text. The entries 404 and 406 relate to text that was generated from an image or from a frame as discussed herein. The entry 408 corresponds to a non-textual content in a frame. A user may also be able to search for text associated with non-textual content.

Thus, the data obtained or generated by the post processing 212 may be directly stored in a database along with any other transcribed text generated by a video data tool. The table 400 illustrates that slide content was detected as discussed herein and that a frame at timecode 00:33:35 was selected. The selected frame was subjected to optical character recognition and post processing that together detected and extracted the textual and non-textual elements visible in the image or frame. Each content was saved in the database alongside the content-type and metadata. In this example of the table 400, the metadata includes, but is not limited to, the speaker and parameters of the detected slide content (e.g., the bounding box).

Embodiments of the invention thus allow slide content to be displayed or queried just like transcribed audio. A viewer of the recorded video data may search all slide text content and go directly to the associated timecodes. Alternatively, a user may search for specific keywords across all textual content, which includes transcribed speech and slide content, and jump to the relevant portion of the video.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods, processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, text identification operations, text extraction operations, bounding box generation operations, metadata extraction operations, searchable text related operations, or the like. More generally, the scope of the invention embraces any operating environment in which the disclosed concepts may be useful.

New and/or modified data collected and/or generated in connection with some embodiments, may be stored in a data storage environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning operations initiated by one or more clients or other elements of the operating environment.

Example cloud computing environments, which may or may not be public, include storage environments that may provide data protection functionality for one or more clients. Another example of a cloud computing environment is one in which processing, data protection, and other services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients, applications, or systems, that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines, containers, or virtual machines (VM), though no particular component implementation is required for any embodiment.

Example embodiments of the invention are applicable to any system capable of storing and handling various types of data of objects, in analog, digital, or other form. Rather, such principles are equally applicable to any object capable of representing information. It is noted that any operation(s) of any of these methods disclosed herein may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments of the invention. These are presented only by way of example and are not intended to limit the scope of the invention in any way.

Embodiment 1. A method comprising: detecting a first scene change in video data, detecting a second scene change in the video data, obtaining a sequence of video frames from the video data between the first scene change and the second scene change, determining whether the sequence of video frames corresponds to slide content, wherein the slide content includes text as an image, performing optical character recognition on a frame selected from the sequence of video frames to identify words and coordinates of the words in the selected frame, performing post-processing on the selected video frame to identify bounding boxes, wherein all words within each of the bounding boxes that contain words are identified as sentences, and storing the sentences in a database as searchable text.

Embodiment 2. The method of embodiment 1, further comprising detecting the first scene change when an average pixel-wise difference between two successive frames is greater than a first threshold value and detecting the second scene change when an average pixel-wise difference between two successive frames is greater than the first threshold value.

Embodiment 3. The method of embodiment 1 and/or 2, further comprising searching the searchable text and viewing a portion of the video data associated with results of the search.

Embodiment 4. The method of embodiment 1, 2, and/or 3, further comprising determining that the sequence of frames is long enough to contain slide content when a number of frames in the sequence of frames is greater than a second threshold value.

Embodiment 5. The method of embodiment 1, 2, 3, and/or 4, further comprising determining an average pairwise distance between all frames of the sequence of frames in a pairwise manner, wherein the sequence of frames is deemed to contain the slide content when the average pairwise distance is less than a third threshold value, wherein the third threshold value is not zero.

Embodiment 6. The method of embodiment 1, 2, 3, 4, and/or 5, further comprising accounting for network issues that affect a quality of the video data and image compression.

Embodiment 7. The method of embodiment 1, 2, 3, 4, 5, and/or 6, wherein the post-processing associates each sentence with a timecode, a content type, coordinates, and metadata.

Embodiment 8. The method of embodiment 1, 2, 3, 4, 5, 6, and/or 7, wherein the content type is speech or slide text and wherein the metadata includes one or more of a speaker and a bounding box location.

Embodiment 9. The method of embodiment 1, 2, 3, 4, 5, 6, 7, and/or 8, wherein the optical character recognition identifies words, coordinates of the words in the selected frame, and timecodes and wherein the post processing generates words, lines, objects, coordinates, and timecodes.

Embodiment 10. The method of embodiment 1, 2, 3, 4, 5, 6, 7, 8, and/or 9, wherein a model is configured to identify bounding boxes of textual content in the selected frame and bounding boxes of non-textual content in the selected frame.

Embodiment 11. A method operable to perform any of the operations, methods, or processes, or any portion of any of these, disclosed herein.

Embodiment 12. A system, comprising hardware and/or software, operable to perform any of the operations, methods, or processes, or any portion of any of these, disclosed herein.

Embodiment 13. A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, engine, agent, service, or client may refer to software objects or routines that execute on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
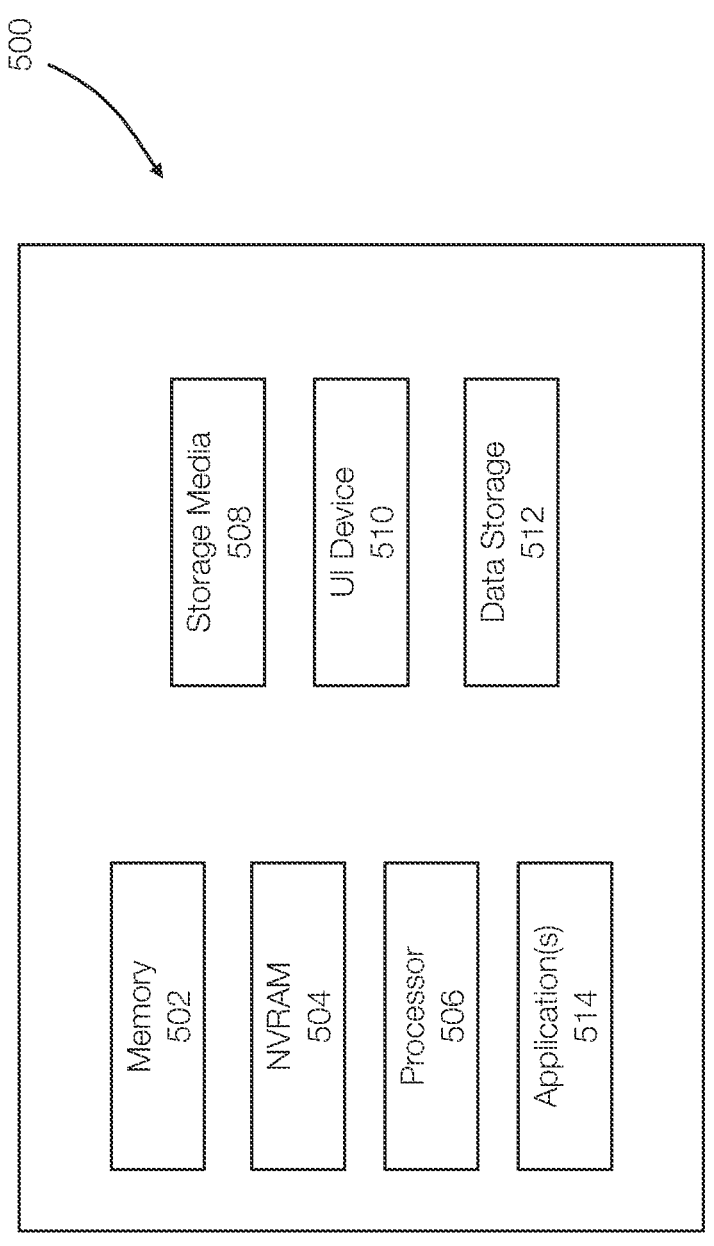
FIG. 5 discloses aspects of a computing device, system, or entity.

With reference briefly now to FIG. 5, any one or more of the entities disclosed, or implied, by the Figures, and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
  detecting a first scene change in video data;
  detecting a second scene change in the video data;
  obtaining a sequence of video frames from the video data between the first scene change and the second scene change;
  determining whether the sequence of video frames corresponds to slide content, using at least (i) a threshold requiring that the sequence include more than a threshold number of frames and (ii) an average pairwise frame-difference threshold that is non-zero, wherein the slide content includes text as an image;
  performing optical character recognition on a frame selected from the sequence of video frames to identify words and coordinates of the words in the selected frame;
  performing post-processing on the selected video frame to identify bounding boxes using a model trained on slide content, and wherein the post-processing groups the words into sentences by using the OCR-identified coordinates of the words to determine which words fall within each textual bounding box and identifying each resulting group of words as a sentence; and
  storing the sentences in a database as searchable text.

2. The method of claim 1, further comprising detecting the first scene change when an average pixel-wise difference between two successive frames is greater than a first threshold value and detecting the second scene change when an average pixel-wise difference between two successive frames is greater than the first threshold value.

3. The method of claim 2, further comprising determining that the sequence of frames is long enough to contain slide content when a number of frames in the sequence of frames is greater than a second threshold value.

4. The method of claim 3, further comprising determining an average pairwise distance between all frames of the sequence of frames in a pairwise manner, wherein the sequence of frames is deemed to contain the slide content when the average pairwise distance is less than a third threshold value, wherein the third threshold value is not zero.

5. The method of claim 4, further comprising accounting for network issues that affect a quality of the video data and image compression.

6. The method of claim 1, further comprising searching the searchable text and viewing a portion of the video data associated with results of the search.

7. The method of claim 1, wherein the post-processing associates each sentence with a timecode, a content type, coordinates, and metadata.

8. The method of claim 7, wherein the content type is speech or slide text and wherein the metadata includes one or more of a speaker and a bounding box location.

9. The method of claim 1, wherein the optical character recognition identifies words, coordinates of the words in the selected frame, and timecodes and wherein the post processing generates words, lines, objects, coordinates, and timecodes.

10. The method of claim 1, wherein a model is configured to identify bounding boxes of textual content in the selected frame and bounding boxes of non-textual content in the selected frame.

11. A non-transitory storage medium having stored therein instructions that are executable by one or more hardware processors to perform operations comprising:
  detecting a first scene change in video data;
  detecting a second scene change in the video data;
  obtaining a sequence of video frames from the video data between the first scene change and the second scene change;
  determining whether the sequence of video frames corresponds to slide content, using at least (i) a threshold requiring that the sequence include more than a threshold number of frames and (ii) an average pairwise frame-difference threshold that is non-zero, wherein the slide content includes text as an image;

performing optical character recognition on a frame selected from the sequence of video frames to identify words and coordinates of the words in the selected frame;

performing post-processing on the selected video frame to identify bounding boxes using a model trained on slide content, and wherein the post-processing groups the words into sentences by using the OCR-identified coordinates of the words to determine which words fall within each textual bounding box and identifying each resulting group of words as a sentence; and storing the sentences in a database as searchable text.

12. The non-transitory storage of claim 11, further comprising detecting the first scene change when an average pixel-wise difference between two successive frames is greater than a first threshold value and detecting the second scene change when an average pixel-wise difference between two successive frames is greater than the first threshold value.

13. The non-transitory storage of claim 12, further comprising determining that the sequence of frames is long enough to contain slide content when a number of frames in the sequence of frames is greater than a second threshold value.

14. The non-transitory storage of claim 13, further comprising determining an average pairwise distance between all frames of the sequence of frames in a pairwise manner, wherein the sequence of frames is deemed to contain the slide content when the average pairwise distance is less than a third threshold value, wherein the third threshold value is not zero.

15. The non-transitory storage of claim 14, further comprising accounting for network issues that affect a quality of the video data and image compression.

16. The non-transitory storage of claim 11, further comprising searching the searchable text and viewing a portion of the video data associated with results of the search.

17. The non-transitory storage of claim 11, wherein the post-processing associates each sentence with a timecode, a content type, coordinates, and metadata.

18. The non-transitory storage of claim 17, wherein the content type is speech or slide text and wherein the metadata includes one or more of a speaker and a bounding box location.

19. The non-transitory storage of claim 11, wherein the optical character recognition identifies words, coordinates of the words in the selected frame, and timecodes and wherein the post processing generates words, lines, objects, coordinates, and timecodes.

20. The non-transitory storage of claim 11, wherein a model is configured to identify bounding boxes of textual content in the selected frame and bounding boxes of non-textual content in the selected frame.

* * * * *